United States Patent [19]
TeWinkle et al.

[11] Patent Number: 5,550,653
[45] Date of Patent: Aug. 27, 1996

[54] COLOR SENSOR ARRAY AND SYSTEM FOR SCANNING SIMPLE COLOR DOCUMENTS

[75] Inventors: Scott L. TeWinkle, Ontario; Paul A. Hosier, Rochester; Fred O. Hayes, Ontario, all of N.Y.

[73] Assignee: Xerox Corporation, Stamford, Conn.

[21] Appl. No.: 462,354

[22] Filed: Jun. 5, 1995

[51] Int. Cl.⁶ .................................................. H04N 1/46
[52] U.S. Cl. .......................... 358/514; 358/513; 358/505; 358/483; 382/163
[58] Field of Search ...................... 358/514, 513, 358/505, 515, 518, 500, 538, 539, 494, 474, 445, 401, 501, 525, 530, 482, 483; 382/162, 163, 166; H04N 1/46

[56] References Cited

U.S. PATENT DOCUMENTS

| | | | |
|---|---|---|---|
| 4,837,591 | 6/1989 | Snelling | 346/159 |
| 5,027,195 | 6/1991 | Cooley et al. | 358/500 |
| 5,148,268 | 9/1992 | Tandon et al. | 358/41 |
| 5,153,421 | 10/1992 | Tandon et al. | 250/208.1 |
| 5,260,799 | 11/1993 | Loce et al. | 358/300 |
| 5,272,764 | 12/1993 | Bloomberg | 358/453 |
| 5,416,611 | 5/1995 | Tandon | 358/474 |
| 5,477,345 | 12/1995 | Tse | 358/514 |

*Primary Examiner*—Kim Yen Vu
*Assistant Examiner*—Madeleine Anh-Vinh Nguyen
*Attorney, Agent, or Firm*—R. Hutter

[57] ABSTRACT

An input scanner for converting original hard-copy images into digital signals is adapted for efficient scanning of simple "business color" documents. Three linear arrays of photosensors, each linear array corresponding to one primary color, are moved relative to the original image. One linear array of photosensors operates on a full cycle and converts every single scan line of the original image into digital signals. Simultaneously, the other primary-color-sensitive linear arrays operate on half cycles and record only signals corresponding to an evenly-distributed subset of small areas of the original image.

12 Claims, 7 Drawing Sheets

COLOR SENSOR ARRAY AND SYSTEM FOR SCANNING SIMPLE COLOR DOCUMENTS

This application incorporates by reference U.S. Pat. No. 5,148,268, assigned to the assignee hereof.

The present invention relates to color image sensor arrays, and more particularly to an image sensor array for efficient scanning of hard-copy images having "highlight color" or "business color."

Monochrome image sensor arrays typically comprise a linear array of photodiodes which raster scan an image bearing document and convert the microscopic image area viewed by each photodiode to image signal charges. Following an integration period, the image signals are amplified and transferred to a common output line or bus through successively actuating multiplexing transistors.

U.S. Pat. No. 5,148,268 discloses a color image sensor array for recording full-color original images as digital data. This patent shows separate linear arrays of photosensors arranged in parallel on a single sensor bar, and caused to move in a scan direction relative to the original image generally perpendicular to the direction of the arrays. The photosensors in each array are provided with a filter thereon of one primary color. As the sensor bar including the three rows of photosensors moves along the original image, each portion of the area of the original image is exposed to each of the rows of photosensors. As each filtered row of photosensors moves past each particular area in the original image, signals according to the different primary color separations of that area are output by the particular photosensors in each row. In this way, three separate sets of signals, each relating to one primary color, will be produced by the linear arrays of photosensors.

In practical applications of full-color input scanner arrays, the original documents or images which are typically scanned in can be roughly divided into two types: relatively sophisticated color images, such as color photographs, wherein a maximal amount of color information from the original is desirable, and from which information may be highly random; and simpler color images, such as those known as "highlight color" or "business color" images, in which the color relationships in the original image are not very complicated. For example, in a typical business document, the color portion of an image could be no more sophisticated than a color graph or pie-chart. Further, it is typical in business color or highlight color documents that the tone or shade of a particular color is consistent throughout a single graphic illustration. The fact that such highlight-color documents are fairly common in business presents opportunities for significantly increasing the efficiency at which original images can be converted into digital data, such as by decreasing the amount of digital memory space required to retain the image data, provided it is known in advance that the incoming document is of the business-color or highlight-color type.

According to one aspect of the present invention, there is provided a method of operating an input scanner having a bar including a first linear array of photosensors sensitive to a first color and a second linear array of photosensors, parallel to the first linear array, sensitive to a second color. The bar is moved relative to an original image being scanned in a process direction perpendicular to the linear arrays. For each of a series of scan cycles as the sensor bar moves, there is caused integration of image signals from the photosensors of the first linear array. For periodically-occurring ones of a series of scan cycles as the sensor bar moves, there is caused integration of image signals from the photosensors of the second linear array.

According to another aspect of the present invention, there is provided a method of operating an input scanner having a sensor bar including a first linear array of photosensors sensitive to a first color, a second linear array of photosensors sensitive to a second color, and a third linear array of photosensors sensitive to a third color, the linear arrays of photosensors being parallel to each other. The bar is moved relative to an original image being scanned in a process direction perpendicular to the linear arrays. For each of a series of scan cycles as the sensor bar moves, there is caused integration of image signals from the photosensors of the first linear array. For periodically-occurring ones of a series of scan cycles as the sensor bar moves, there is caused integration of image signals from the photosensors of the second linear array and the photosensors of the third linear array.

According to another aspect of the present invention, there is provided a method of operating an input scanner having a sensor bar including a first linear array of photosensors sensitive to a first color, and a second linear array of photosensors sensitive to a second color parallel to the first linear array. The bar is moved relative to an original image being scanned in a process direction perpendicular to the linear arrays, thereby exposing a series of small areas of the original image to each of the photosensors of each linear array, each exposure of a small area corresponding to a scan cycle. For a series of scan cycles as the bar moves, signals generated by the first linear array of photosensors corresponding to all small areas of the original image exposed to the first linear array of photosensors are retained in a memory. For a series of scan cycles as the bar moves, signals generated by the second linear array of photosensors corresponding to an evenly-distributed subset of small areas of the original image exposed to the second linear array of photosensors are retained in the memory.

Figure 6:
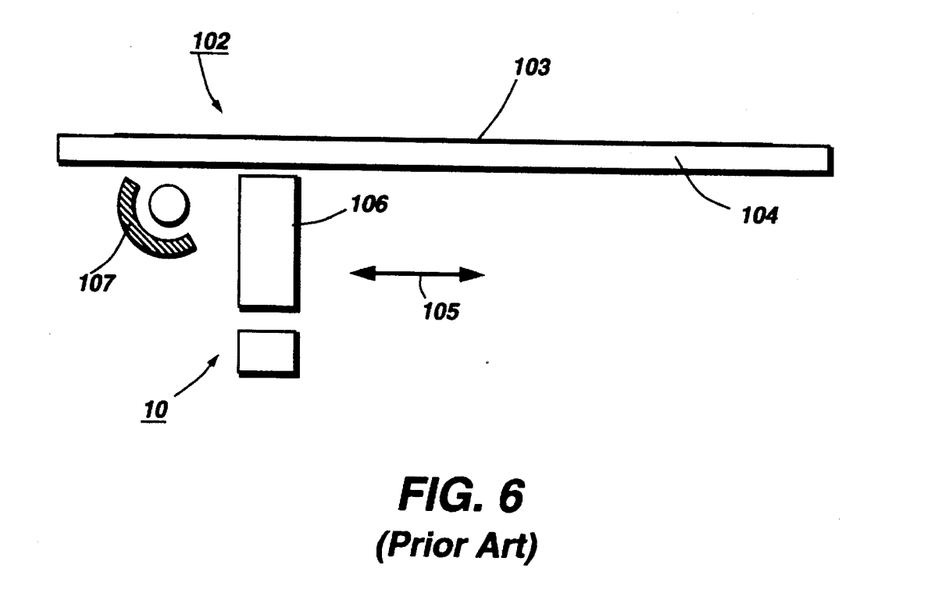
FIG. 6 is a schematic view of a raster input scanner having a full width array.

Referring to FIG. 6, there is shown an exemplary raster input scanner, designated generally by the numeral 102, of the type adapted to use a scanning array, or sensor bar, 10. Sensor bar 10 comprises a linear full width array having a scan width in the fast scan direction substantially equal to or slightly greater than the width of the largest document 103 or other object to be scanned. Documents to be scanned are supported on a generally rectangular transparent platen 104, typically glass, sized to accommodate the largest original document 103 to be scanned. A document 103 to be scanned is located either manually or by a suitable automatic document handler or feeder (not shown) on platen 104 for scanning. Array 10 is supported for reciprocating scanning movement in the scan direction depicted by arrows 105 below platen 104 by a movable scanning carriage (not shown). A lens 106 focuses array 10 on a line like area extending across the width of platen 104. One or more lamp and reflector assemblies 107 are provided for illuminating the line-like area on which array 10 is focused.

Figure 7:
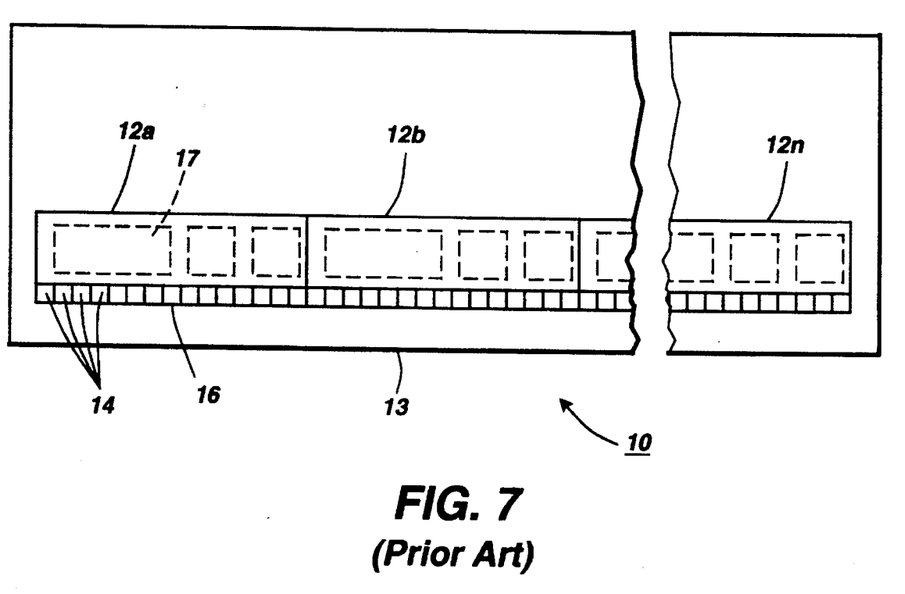
FIG. 7 is a top view illustrating a full width color array of the type fabricated by abutting a plurality of chips of the present invention together.

Referring to FIG. 7, there is shown a long or full width sensor bar 10 composed of a plurality of smaller sensor chips 12 assembled together end-to-end (specific chips are identified by numerals 12a, 12b, . . . 12n) on an elongated generally rectangular rigid substrate 13.

Chips 12, which may, for example, be charge coupled devices (CCDs) or MOS sensor arrays, are relatively thin silicon dies having a generally rectangular shape. A row 16 of photosite areas 14 parallel the longitudinal axis of the chips. While a single row 16 of photosite areas 14 is shown, plural photosite area rows may be contemplated. Other active elements such as shift registers, gates, pixel clock, etc., (designated generally by the numeral 17 herein) are preferably formed integrally with chips 12. Suitable external connectors (not shown) are provided for electrically coupling the chips 12 to related external circuitry.

In the case of color scanning, the individual photosite areas are subdivided into three photodiodes, enabling the photosite areas to detect three different wavelength ranges. Normally, these comprise the three primary colors, i.e., blue, green, and red. While the invention is described in the context of the three primary colors, the invention is not limited to those colors or color combination. Other colors and color combinations such as cyan, magenta and yellow, etc. may instead be envisioned. Also, while a three color sensor is disclosed, color sensors containing photodiodes of any number may be envisioned.

Figure 8:
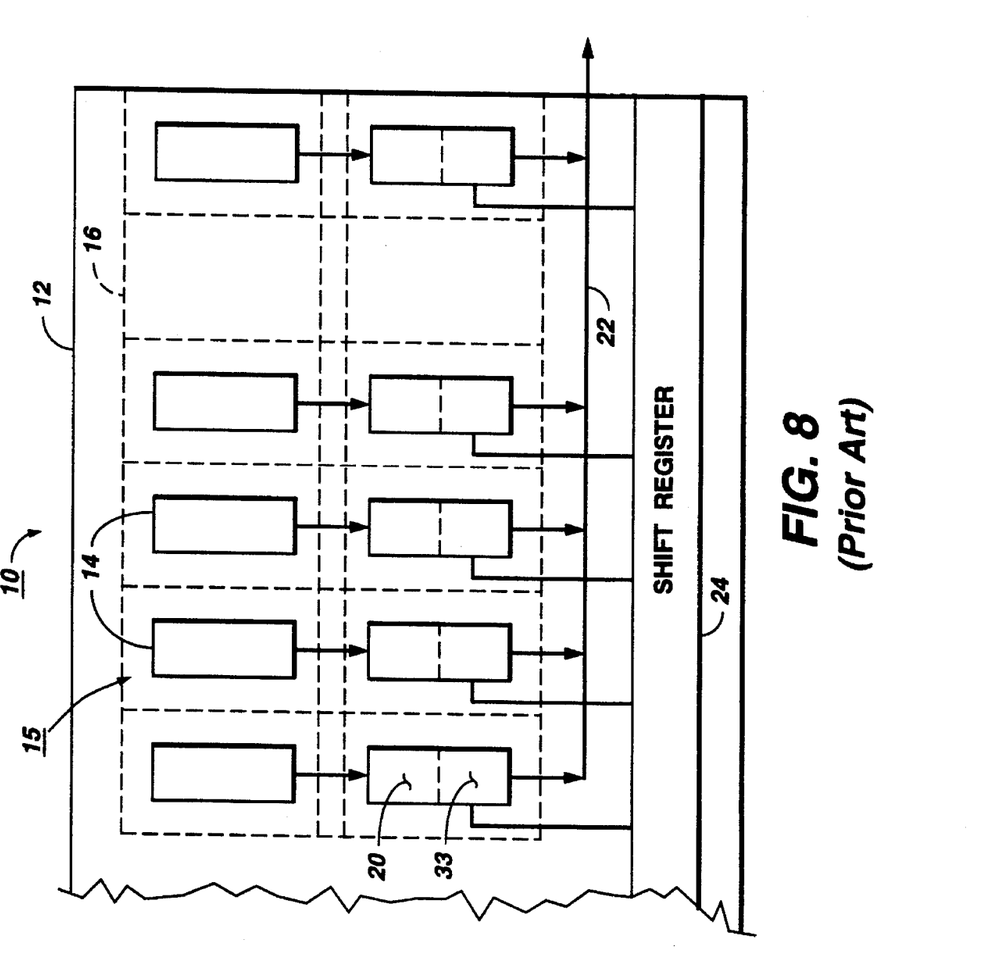
FIG. 8 is a schematic view of an image sensor bar having an array of photosite cells, each cell having a photodiode area with a two stage transfer circuit and an amplifier for transferring image signal charges from the photodiode areas to a common output bus.

Referring to FIG. 8, there is shown the color image sensor bar with two stage transfer, designated generally by the numeral 10. Sensor bar 10 includes a base or chip 12 of silicon with a plurality of photosite areas 14 thereon. Photosite areas 14 are in closely spaced in juxtaposition with one another on chip 12 in a linear array or row 16. As previously mentioned, several smaller arrays can be abutted together end to end with one another to form a longer array, i.e. a full width or contact array, with spacing between the photodiodes at the butted ends the same as the spacing between the photodiodes inside the chip, thereby maintaining a consistent photodiode pitch across the entire full width of the composite array.

Figure 1:
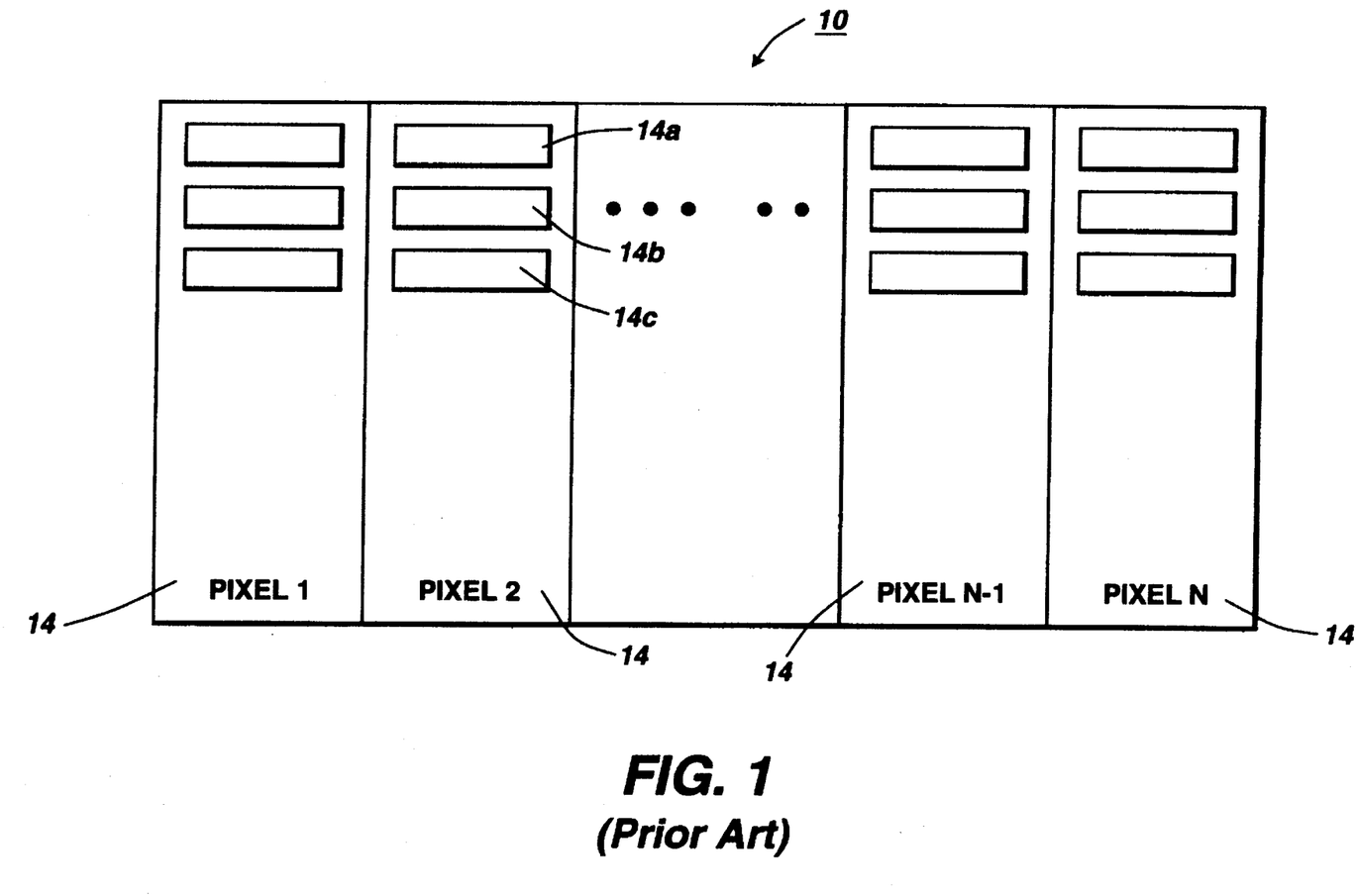
FIG. 1 is a plan view of photosite areas of a sensor bar.

Referring to FIG. 1, each photosite area 14 on a sensor bar 10 includes photodiodes 14a, 14b, 14c representing the three primary colors. While photodiodes 14a, 14b, 14c are shown and described herein, other photosite types such as amorphous silicon or transparent electrode MOS type photosites may be envisioned. Further, while a one dimensional sensor array having a single row 16 of photosite areas 14 is shown and described herein, a two dimensional sensor array with plural rows of photosite areas may be contemplated.

Figure 2:
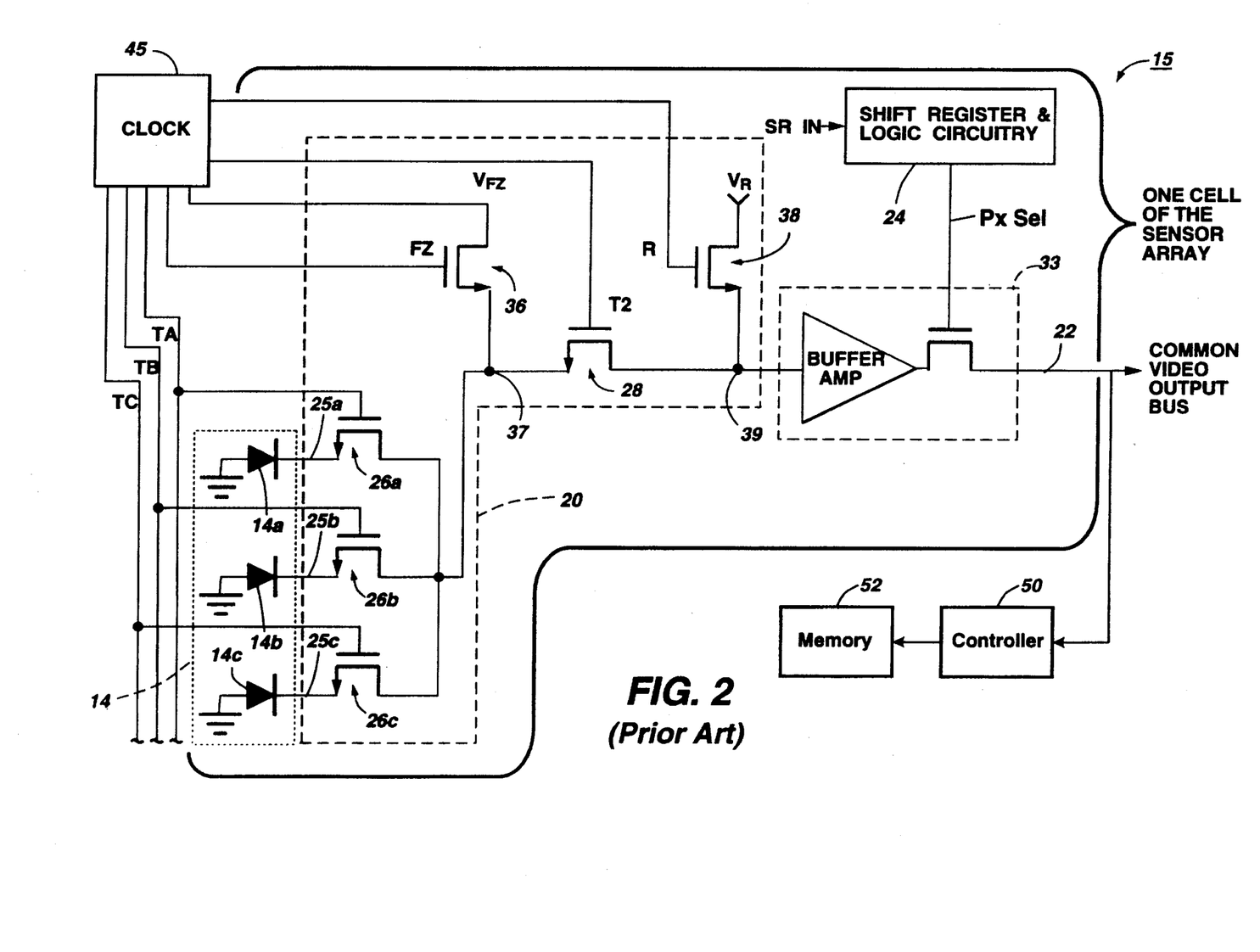
FIG. 2 is a circuit schematic showing a pixel cell.

Referring to FIG. 2, each photosite area 14 has a two stage transfer circuit 20 associated therewith which together with the photodiode area and an amplifier 33 form a photosite cell 15 at the array front end. In each cell 15, the image signal charge from the photodiode area is transferred by circuit 20 to amplifier 33 where the image signal charge from photodiode area 14 is amplified to bring the image signal charge to a desired potential level prior to transferring the charge to a common video output line or bus 22. Suitable shift register and logic circuitry 24 provide timing control signals PxSel for connecting each pixel cell 15 to bus 22 in the proper timed sequence.

Sensor bar 10 may for example be used to raster scan a document original, and in that application, the document original and the sensor array 10 are moved or stepped relative to one another in the slow scan direction perpendicular to the linear axis of array 10. At the same time, the array scans the document original line by line in the fast scan direction parallel to the linear axis of the array. The image line being scanned is illuminated and light from the document is focused onto the photodiodes in photodiode area 14. During an integration period, a charge is developed on each photodiode proportional to the reflectance of the image area viewed by each photodiode. The image signal charges are thereafter transferred by two stage transfer circuits 20 via amplifier 33 to output bus 22 in a predetermined step by step timed sequence.

The two stage transfer circuit 20 associated with each cell 15 has first-stage transfer transistors 26a, 26b, 26c, and a second-stage transfer transistor 28 for transferring the image signal charge from the photodiodes 4a, 14b, 14c to amplifier 33. Transistors 26a, 26b, 26c are in series with lines 25a, 25b, 25c connecting one electrode of photodiodes 14a, 14b, 14c with the input gate of amplifier 33. The other electrode of photodiodes 14a, 14b, 14c is grounded. A bias charge injection transistor 36 is provided to inject a bias charge, for example, an electrical fat zero $V_{FZ}$, to line 25 at middle node 37. A reset transistor 38 controls the reset voltage $V_R$ at the node 39 between transistor 28 and amplifier 33.

A suitable clock 45 provides a suitable source pulses $\Phi_R$, $\Phi_{tA}$, $\Phi_{tB}$, $\Phi_{tC}$, $\Phi_{t2}$, $\Phi_{FZ}$, and $V_{FZ}$. Pulses $\Phi_{tA}$, $\Phi_{tB}$, $\Phi_{tC}$, $\Phi_{FZ}$, and $V_{FZ}$ provide for injection of the bias charge into lines 25a, 25b, 25c and pulses $\Phi_{t2}$ and $\Phi_R$ for setting node 39 to voltage $V_R$. As will appear, pulses $\Phi_{tA}$, $\Phi_{tB}$, $\Phi_{tC}$, of different amplitude are provided for transferring the image signal charges from photodiodes 14a, 14b, 14c to amplifiers 33. The PxSel signals used for multiplexing the amplified charge output by amplifier 33 onto the common video output bus 22 are provided by shift register and logic circuitry 24.

In operation, pulse $\Phi_R$ actuates reset transistor 38 to apply reset voltage $V_R$ to node 39 to reset the input to amplifier 33. Subsequently, pulse $\Phi_{tA}$ and $\Phi_{t2}$ actuate transistors 26a and 28 respectively of two stage transfer circuit 20 to transfer the image signal charge accumulated on the photodiode 14a of each cell 15 to amplifiers 33. To facilitate transfer of the image signal charges, the amplitude $V(\Phi_{tA1})$ of waveform $\Phi_{tA}$ is smaller than the amplitude $V(\Phi_{t2})$ of pulse $\Phi_{t2}$. During injection of the bias charge, the $\Phi_{tA}$ and $\Phi_{FZ}$ pulses go high while pulse $V_{FZ}$ goes low. Following preset intervals, the pulses $V_{FZ}$, $\Phi_{tA}$, and $\Phi_{FZ}$ return to their nominal level.

U.S. Pat. No. 5,148,268, the patent incorporated by a reference herein, explains in detail the operation of clock 45 for operating the transistors 26a–c, etc., in order to read out signals from the photodiodes 14a–c with each scan of the moving sensor bar. Briefly, it will be apparent that, as the sensor bar moves relative to a document or other object being scanned, each primary-color photosensor 14a–c in one cell 15 across the bar will be sequentially exposed to a particular location on the original document, and as each photodiode 14a–c is in turn exposed to the particular location on the document, the diode will accumulate charge proportional to the amount of that primary color in the portion of the original image, so that three charge signals, each corresponding to one primary color in the particular location, will be produced. In order to read out these three primary-color signals from the photodiodes 14a–c in a usable sequence on the video output bus 22, clock 45 operates the various transistors in the transfer circuit 20, generally as indicated in the patent incorporated by reference.

Also apparent in FIG. 2 is a controller indicated as 50 and a memory indicated as 52. The output bus 22 from each cell 15 of the sensor array is ultimately connected to processor 50 and memory 52. As will be explained in detail below, a series of signals from various linear arrays of photodiodes 14a–c feed signals through the associated transfer circuits 20 onto an individual bus 22, and the set of signals from a plurality of such buses 22 are ultimately multiplexed or fed to the processor 50, where they may be processed according to some image-processing technique. Such image-processing techniques may include converting the analog signals from the transfer circuits into digital signals. After processing by processor 50, the image signals, either digital or analog, can be retained as required in memory 52 for future use.

With particular relevance to the present invention, the important parameters which are ultimately controlled by the action of clock 45 involve the integration of charges accumulated on the primary-color photosensors 14a–c of each cell 15 across a sensor bar. The integration of these charges represents the transference of a charge having a particular magnitude (which relates directly to the amount of primary color for a particular location in the original image being scanned) through the transfer circuit 20 and on to the video bus 22. In brief, each photodiode 14a–c is available to receive light, which creates a charge thereon, at all times. In order to control an individual photodiode in a scanning process, the key parameter is the timing of events in which the particular photodiode is discharged, the discharge eventually forming the video image signal. As the sensor bar moves relative to the image being scanned, each individual photosensor for each primary color receives a certain amount of exposure time in which the particular photosensor is permitted to receive light from the particular location of the image being scanned; this principle is equivalent to opening a shutter to allow film to be exposed in a camera.

With every scan cycle, the photodiode is temporarily shut off in order to allow the charge accumulated thereon in the scan cycle to be read out through the transfer circuit 20. As used in the claims herein, the "integration" shall mean the portion of each scan cycle in which light from the image or object being scanned is permitted to charge a particular photodiode. With the fat-zero injection system in the preferred embodiment of the present invention, the start and end of each integration period is determined by the function of the transfer circuit 20: each integration begins when a fat-zero bias is injected onto the particular photodiode, and ends when the associated transistor 26 causes the discharge of the photodiode, transferring the charge through transfer circuit 20 onto the reset node 39.

Although the basic hardware illustrated above for recording full-color hard-copy images is versatile for any type of color image, it is fairly common in a business-document context that a user of such a scanner will know in advance that a set of documents to be scanned in through the scanner will have at best only very simple color relationships therein. As mentioned above, the vast majority of color business documents include nothing more complicated than a graph or pie-chart, with no subtle gradations of tone within the colors of the graphics. If it is known in advance that only simple color relationships will be apparent, there is an opportunity for significant optimization of the system, in which an equal amount of image information can be summarized in a significantly smaller amount of pixel data and/or can be scanned in at a faster rate. This special adaptation for highlight color scanning can conceivably be manifest in the design of the scanner hardware, control software, or in a combination of both.

The present invention records only a proportion of the color signals relating to two of the three primary colors, when it is known in advance that only simple color documents will be scanned. More specifically, according to a preferred embodiment of the present invention, a three-primary-color scanner bar is used to expose the original image, but only the green-sensitive photosensors record every scan line of the original image as the bar moves relative to the image. The other two linear arrays of photosensors in the bar, sensitive to either red or blue, record only every other scan line in the original image. In other words, the linear arrays of the red and blue photosensors will be "on" only for periodically-occuring scan cycles, so that these linear arrays in effect skip every other line (or more) of the image, while the green-sensitive linear array operates for every single line of the image.

Figure 3:
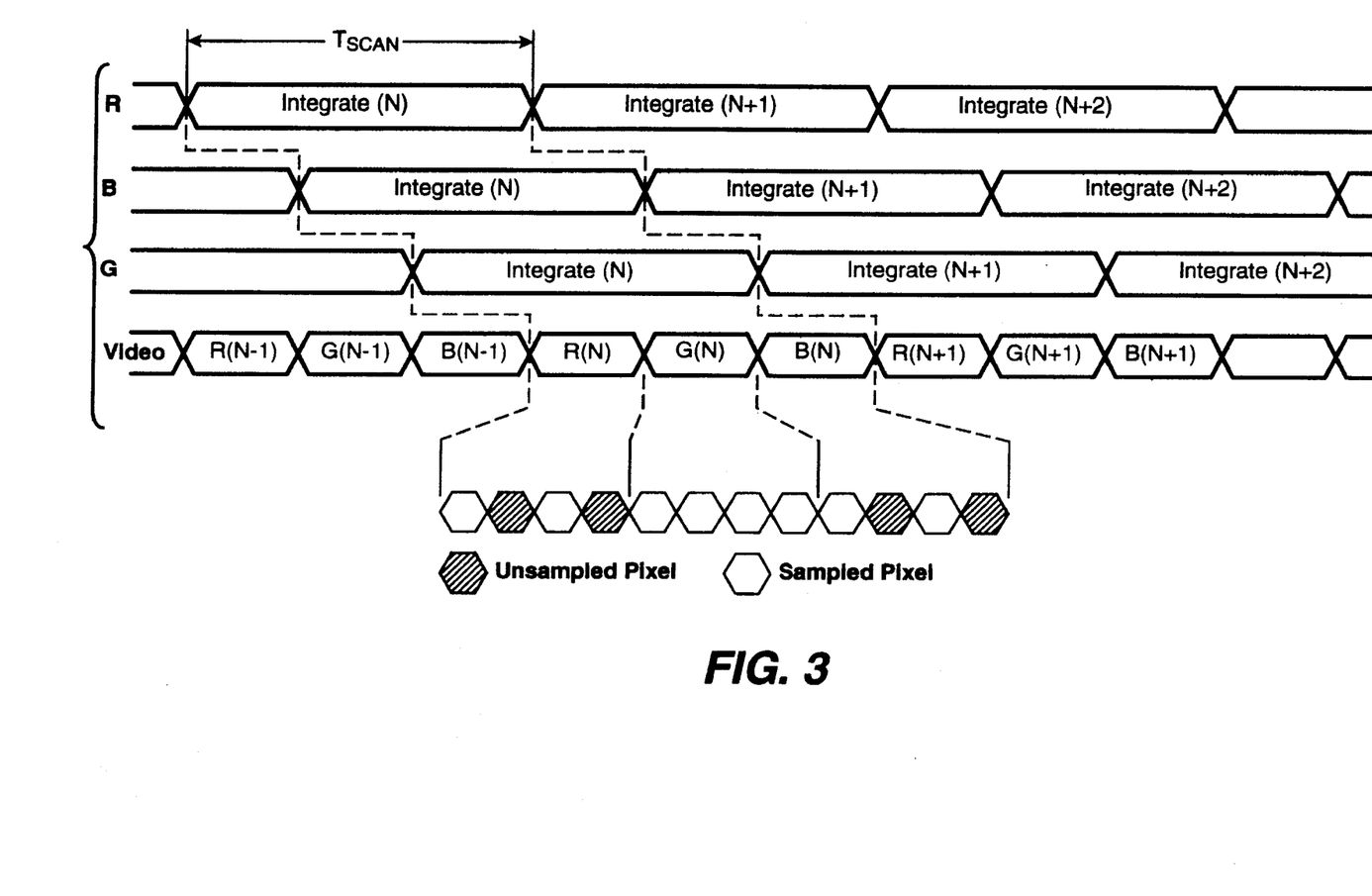
FIG. 3 is a timing diagram illustrating the timing of integration periods of different primary-color-sensitive linear arrays of photodiodes, and the output video line from the linear arrays of photosensors, according to an embodiment of the present invention.

FIG. 3 is a timing diagram illustrating the integration and exposure times for the primary-color-sensitive photodiodes such as 14a–c in FIGS. 1 or 2, for each of the set of photosensors throughout a linear array. As shown in the lines marked R (red), B (blue), and G (green) across the timing diagram, the "thick" portion of each line indicates the exposure duration for all of the photodiodes in the particular linear array corresponding to each linear array 14a–c in FIG. 1. The fourth line shown in FIG. 3, marked VIDEO, indicates the resultant output from the succession of signals from the different linear arrays as they would appear on reset node 39 and video bus 22 of the transfer circuit shown in FIG. 2. As noted above, and as further explained in the patent incorporated by reference, the operation of each transfer circuit by which signals are transferred from the photodiodes 14a–c to video output bus 22 at a particular time is ultimately a function of the programming of the clock 45 which controls the various transistor switches in each transfer circuit.

As can be seen in FIG. 3, the transference of signals from each primary-color-sensitive linear array is performed on a regular, staggered basis. As can be seen in the VIDEO line in FIG. 3, the signals corresponding to each primary-color set of photodiodes appear on the video line essentially immediately after the end of a particular integration period with each cycle. In FIG. 3, the annotations N, N+1, N+2, etc. corresponding to each cycle indicate individual complete scan lines of the original image being scanned, as the bar 10 moves relative thereto. Thus, on the video line, according to the illustrated embodiment, there appears a scan line's worth of red signals (i.e., from the red-sensitive photodiodes in the bar), followed by a scan line's worth of green signals, and then a scan line's worth of blue signals. The relationship of integration periods and signals on the video line is hereshown in simplified form, for the sake of clarity. There may in fact be gaps and/or delays between the end of each integration period and the appearance of the resultant signals on the video line; the finer details of the timing will depend on the specific design of the hardware.

At the bottom of FIG. 3 are shown three example "expansions" of sections of signals which in sequence form the video signal. Each indicated section of the video signal in the VIDEO line corresponds to a scan line's worth of signals of a particular primary color. The smaller hexagons, illustrated in the bottom line in FIG. 3, represent individual pixel signals which together form entire lines of pixel signals within each set of signals on the VIDEO line. In a real-world embodiment, there would of course be more than four individual pixel signals within each section on the video line; typically there would be as many signals within each section as there are photosensors in each linear array, such as 256. However, for clarity, four individual pixel signals for each section of video are shown as an example.

According to one technique, for the red- and blue-photodiode signals, an image-processing system downstream of the video line, such as shown as processor 50 FIG. 2, is programmed to accept only every other pixel signal, while for the green signal, every pixel signal is accepted. The effect of this is to reduce the amount of red and blue pixel data by half relative to the amount of green pixel data. This technique obtains the generally desirable final result of yielding sufficient information about a highlight-color document with considerably less pixel data to be stored, for example, in memory 52. However, because every pixel signal is output on video line 22, and half of the red and blue pixel data is discarded by processor 50 and does not reach memory 52, no real savings is obtained in the rate of scanning output. Nonetheless, this simple technique, which can be programmed into software for image processing, can yield a desirable result of retaining highlight-color image data with less than a usually-required amount of space in memory 52.

Figure 4:
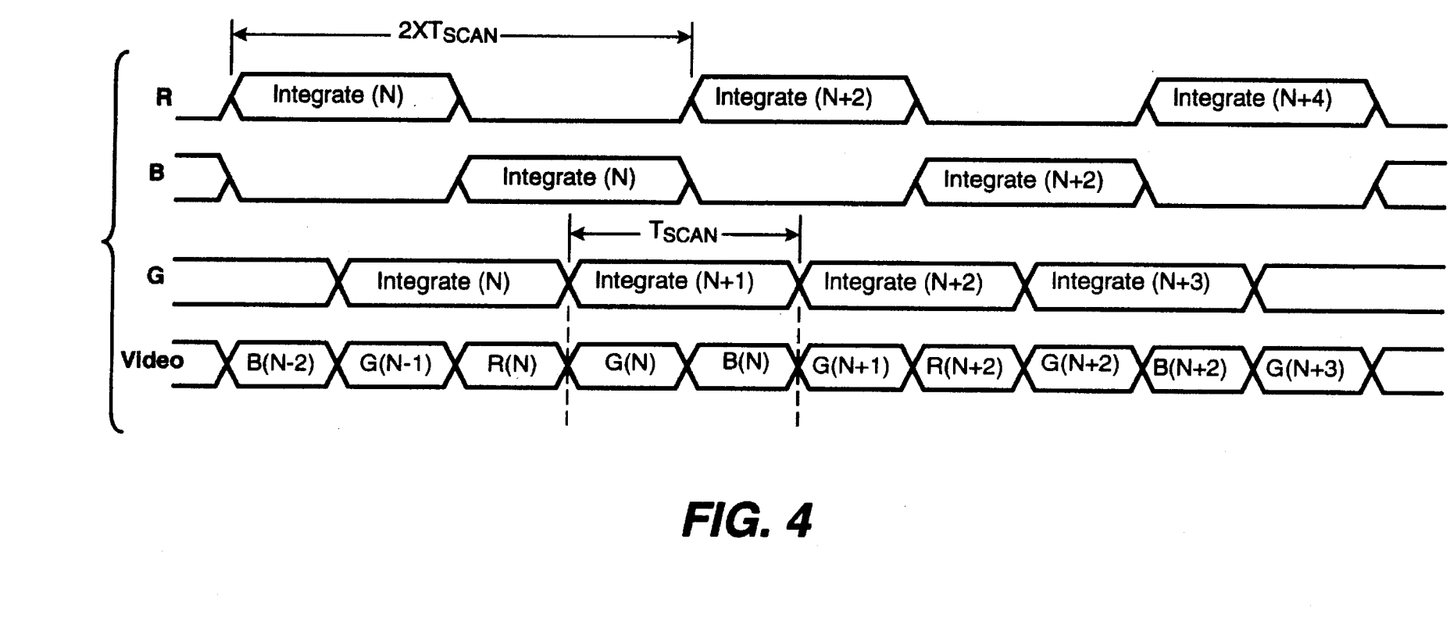
FIG. 4 is a timing diagram showing the operation of primary-color-sensitive linear arrays of photodiodes according to a preferred embodiment of the present invention.

FIG. 4 is a timing diagram showing the transference of pixel signals onto a video line for a preferred embodiment of the present invention. In this embodiment, while the signals from the green-sensitive photodiodes are integrated and transferred to the video line with each scan cycle N, N+1, N+2, N+3, etc., the red and blue-sensitive photodiodes are integrated and transferred to the video line only with every other scan cycle; as illustrated, scan cycles N, N+2, N+4, etc. Thus, there appears on the VIDEO line a sequence of signals of the blue, green, and red photodiodes of one line, followed by only signals from the green photodiodes for the next scan lines, and followed again by a sequence of red, green, and blue signals for the next scan line. This pattern can be seen in the video line in the fact that, for example, the red, green, and blue signals for the N scan cycle is followed immediately by only the green signals from the N+1 scan cycle, followed by the red, green, and blue signals from the N+2 scan cycle. There is thus created an alternation between full-color signal sets and green-only signal sets. As mentioned above, in the preferred embodiment of the present invention, the green-sensitive photodiodes are preferably receptive of signals which are indicative of black portions of an original image.

It will be noted in FIG. 4 that, for each scan cycle N, N+2, etc., for which each of the three linear arrays output a signal to the video line, the integration period for the red signal begins slightly before the beginning of the integration period for the green signals, and the integration period for the blue signal begins after the end of the integration period for the red signals and during the integration period for the green signals. There are two key reasons why such a staggered arrangement of integration periods is desirable. First, as can be seen in the VIDEO line in FIG. 4, if it is intended that the transfer of a set of video signals should essentially immediately follow the end of an integration period, the staggering of the integration periods for different color-sensitive arrays allows the various signal sets to be output onto the video line without any delays caused by temporary retention.

Another important reason why the integration period for the red-sensitive photodiode slightly precedes that for the green-sensitive photodiodes and the integration period for the green-sensitive photodiodes slightly precedes the blue-sensitive photodiodes is to take into account the relative spacing of the different primary-color-sensitive photodiodes in the different linear arrays within the sensor bar 10 moving relative to the original image. It is generally desirable that, for each scan line, each primary-color-sensitive linear array of photodiodes "looks at" essentially the same small area on the original image. The general staggering of integration periods for the different primary-color-sensitive linear arrays enables each linear array to be exposed to generally the same small area in sequence as the scanner bar moves relative to the original image.

Figure 5:
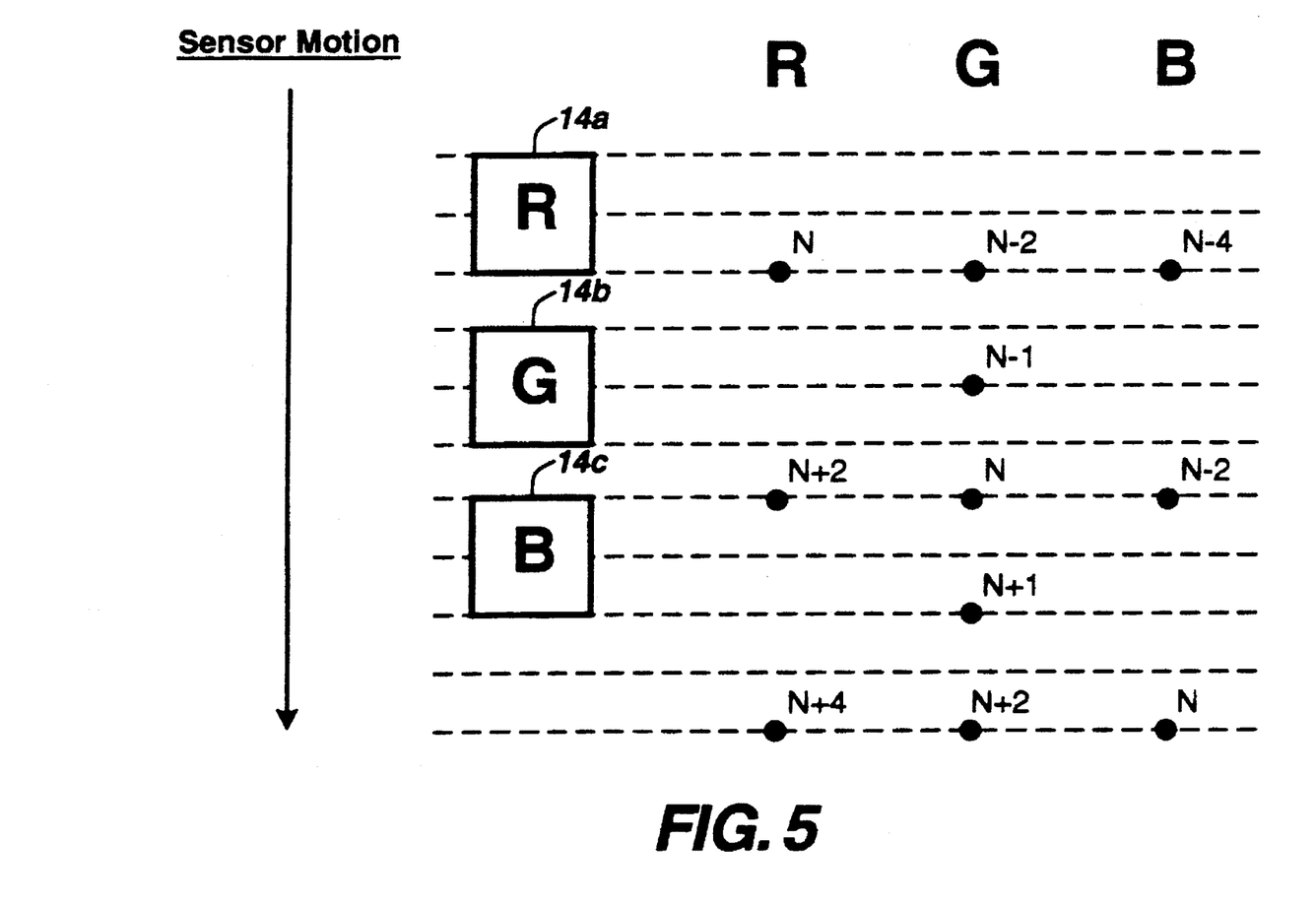
FIG. 5 is a plan view of a small area of an image being scanned, with representations of a single triad of primary-color photosensors.

FIG. 5 is a plan view of a portion of an original image being scanned, with superimposed thereon squares representing the surface areas of one triad of photodiodes (that is, a set of primary-color photodiodes corresponding to the same general portion of their respective linear arrays), showing the operation of the different primary-color photodiodes relative to specific areas on the original image. In FIG. 5, the dotted horizontal lines represent both specific locations on the original image and, because the three photodiodes 14*a*-care intended to move at a constant velocity downward in the view of FIG. 5 relative to the image being scanned, also represent specific times in which individual photodiodes are activated and deactivated forming individual integration times. As shown in FIG. 5, the individual behaviors of the red, green, and blue photosensors are shown in separate columns; however, in an actual embodiment, the three columns shown in FIG. 5 are in fact superimposed on the original image being scanned. It is generally desirable that the linear array which is intended to be activated with every scan cycle (here, the green-sensitive photosensor array such as 14*b*) be placed between the other two linear arrays, as illustrated by the placement of the green photosensor in FIG. 5, in order to make for an elegant arrangement of integration times of the different linear arrays.

The heavy spots shown in FIG. 5 represent the "centers of gravity" of small areas of the original image which are viewed with each integration time of each photodiode 14*a*–*c*. The presence of this "center of gravity" is reflective of the fact that the integration time for a particular photodiode begins when the photodiode is slightly above (as shown in FIG. 5) the center of gravity ends when the photodiode is slightly below the center of gravity. The numbers next to each heavy dot in FIG. 5 represent numbers corresponding to individual scan cycles such as N, N+1, N+2, etc. The fact that heavy spots corresponding to different scan cycles occur in different horizontal rows in different columns is reflective of the fact that the individual photosensors 14*a*–*c* are spaced along the direction of sensor motion.

It will be noted in FIG. 5 that the green photodiode is allotted twice as many centers of gravity, corresponding to twice as many integration periods, over a period of time than either the red or the blue photodiode in the triad. This condition reflects the fact that both the red and the blue photodiodes are controlled to expose with every other scan cycle, or in other words to skip every other scan cycle. Thus, while the green photodiode is exposed in a manner for a full-resolution rendering of the image, the red and blue photodiodes are operated for a half-resolution rendering (along the direction of motion of the sensor bar) of the original image. As mentioned above, if it is known in advance that the original image has only simply color relationships and not, for example, complicated color photographs, this reduced-resolution rendering of the red and blue portions of the image will be sufficient for subsequent processing of the original image. The advantages of the every-other-scan-cycle operation of the red and blue photodiodes are that the scanner can operate at a considerably higher speed, and that all of the necessary image information can be retained in a smaller amount of pixel data.

In a practical embodiment of the present invention, the precise beginnings and endings of the integration times for the various linear arrays of photodiodes can be slightly adjusted so that the centers of gravity of portions of the image read by each of the photodiodes can be more closely superimposed.

Although in the preferred embodiment of the present invention, the red and blue photosensors are operated only with every other scan cycle, it is conceivable that the red and blue photosensors can be activated with even less frequency. For example, it may be possible to provide a system in which the red- and blue-sensitive linear arrays of photodiodes are activated only with every third scan line. The advantage of activating the red and blue-sensitive linear arrays with even less frequency is to decrease the total amount of "necessary" image data, although of course it is possible that unacceptable image degradation could occur.

Generally comparing the techniques of saving memory space for highlight-color data in FIG. 3 and FIG. 4, it can be seen that both techniques effectively cause the red and blue photosensors to expose only a subset of the possible number of small areas on the original image. With the FIG. 4 technique, every other scan line that could be exposed by either the red or blue photosensor array is skipped, because there is no integration of signals for every other scan line as the sensor bar moves relative to the original image. This skipping of scan lines for red and blue can be seen, for example, in FIG. 5. That is, every other scan line of small areas on the original image is skipped along the direction the sensor bar moves relative to the original image. With the FIG. 3 technique, however, all of the different primary-color-sensitive linear arrays of photosensors are operative for every single scan line on an original image being scanned. However, for the red- and blue-sensitive arrays, the signal from every other photosensor is dropped or ignored by processor 50, and so does not reach memory 52. The effect of this technique is that the subset of small areas which are in fact exposed to the photosensors and caused to create signals which are retained in memory are arranged in "stripes" which run perpendicular to the linear array, because, for example, only the odd-numbered photosensors in a particular array may be active as the bar moves. In either case, whether entire scan lines are skipped or whether individual alternating photosensors within each scan line are skipped, the result is that an evenly-distributed set of small areas are exposed on the original image by the sensor bar.

While the invention has been described with reference to the structures disclosed, it is not confined to the details set forth, but is intended to cover such modifications or changes as may come within the scope of the following claims.

We claim:

1. A method of operating an input scanner having a bar including a first linear array of photosensors sensitive to a single first color and a second linear array of photosensors, parallel to the first linear array, sensitive to a single second color, comprising the steps of:

moving the bar relative to an original image being scanned in a process direction perpendicular to the linear arrays;

for each of a series of scan cycles as the sensor bar moves, causing integration of image signals from the photosensors of the first linear array; and for a periodically-occurring subset of the series of scan cycles as the sensor bar moves, causing integration of image signals from the photosensors of the second linear array.

2. The method of claim 1, wherein an integration period for the photosensors of the second linear array within an scan cycle begins during an integration period for the photosensors of the first linear array.

3. The method of claim 2, wherein the integration period for the photosensors of the first linear array and the integration period for the photosensors of the second linear array are of equal duration within each scan cycle.

4. The method of claim 1, the scanner further including a video line, a transfer circuit associated with each photosensor, the transfer circuit adapted to transfer a charge related to a light intensity on the photosensor to the video line, and a controller adapted to operate a transfer circuit associated with a photosensor at a particular time within a scan cycle.

5. The method of claim 4, further comprising the step of for each periodically-occurring one scan cycle, the controller causing charges to be transferred from the first linear array of photosensors to the video line, and immediately thereafter causing charges to be transferred from the second linear array of photosensors to the video line.

6. A method of operating an input scanner having a sensor bar including a first linear array of photosensors sensitive to a single first color, a second linear array of photosensors sensitive to a single second color, and a third linear array of photosensors sensitive to a single third color, the linear arrays of photosensors being parallel to each other, comprising the steps of:

moving the bar relative to an original image being scanned in a process direction perpendicular to the linear arrays;

for each of a series of scan cycles as the sensor bar moves, causing integration of image signals from the photosensors of the first linear array; and for a periodically-occurring subset of the series of scan cycles as the sensor bar moves, causing integration of image signals from the photosensors of the second linear array and the photosensors of the third linear array.

7. The method of claim 6, wherein the first linear array is disposed between the second and third linear arrays, and an integration period for the photosensors of the first linear array within an scan cycle begins before a beginning of an integration period for the photosensors of the second linear array and after a beginning of an integration period for the photosensors of the third linear array.

8. The method of claim 6, the scanner further including a transfer circuit associated with each photosensor, the transfer circuit adapted to transfer a charge related to a light intensity on the photosensor to a video line, and a controller adapted to operate a transfer circuit associated with a photosensor at a predetermined time within a scan cycle.

9. The method of claim 8, further comprising the steps of for each periodically-occurring one scan cycle, the controller causing charges to be transferred from the photosensors in the first linear array to the video line, causing charges to be transferred from the photosensors in the second linear array to the video line, and causing charges to be transferred from photosensors in the third linear array to the video line; and for each scan cycle not a periodically-occurring one scan cycle, the controller causing charges to be transferred only from the first linear array to the video line.

10. A method of operating an input scanner having a sensor bar including a first linear array of photosensors sensitive to a first color, and a second linear array of photosensors sensitive to a second color parallel to the first linear array, comprising the steps of:

moving the bar relative to an original image being scanned in a process direction perpendicular to the linear arrays, thereby exposing a series of small areas of the original image to each of the photosensors of each linear array, each exposure of a small area corresponding to a scan cycle;

for a series of scan cycles as the bar moves, retaining in a memory signals generated by the first linear array of photosensors corresponding to all small areas of the original image exposed to the first linear array of photosensors; and for a series of scan cycles as the bar moves, retaining in the memory signals generated by the second linear array of photosensors corresponding to an evenly-distributed subset of small areas of the original image exposed to the second linear array of photosensors.

11. The method of claim 10, wherein the signals generated by the second linear array of photosensors correspond to small areas of the original image reflective of complete scan lines across the linear array.

12. The method of claim 10, wherein the signals generated by the second linear array of photosensors correspond to small areas of the original image reflective of periodically-distributed individual photosensors along the second linear array.

* * * * *